Figure 1:
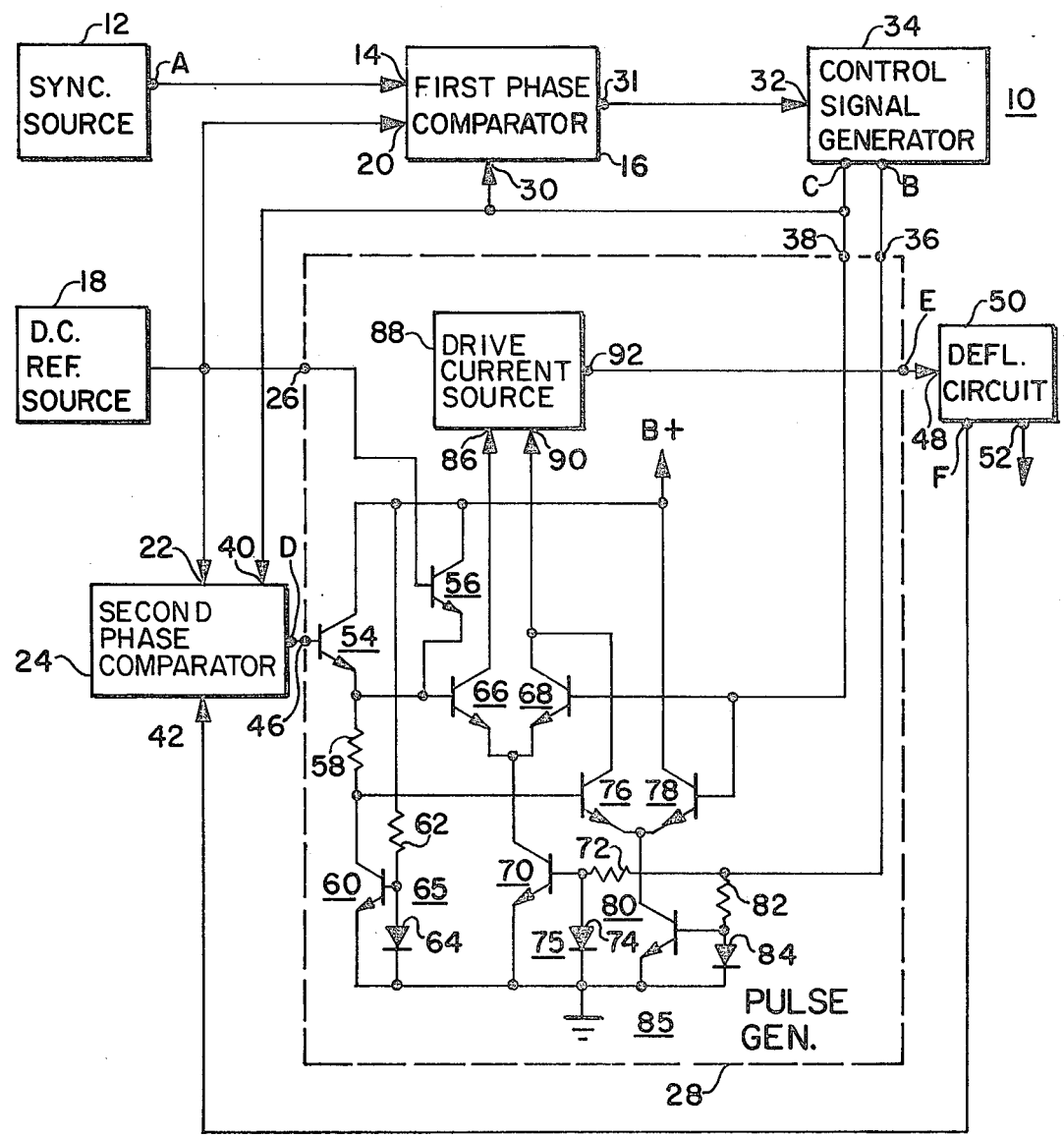

United States Patent [19]
Avery

[11] 3,992,648
[45] Nov. 16, 1976

[54] DRIVE PULSE GENERATOR FOR A TELEVISION DEFLECTION CIRCUIT

[75] Inventor: Leslie Ronald Avery, Lightwater, England

[73] Assignee: RCA Corporation, New York, N.Y.

[22] Filed: May 22, 1975

[21] Appl. No.: 579,991

[30] Foreign Application Priority Data
Feb. 11, 1975 United Kingdom............ 46962/75

[52] U.S. Cl.............................. 315/387; 315/364
[51] Int. Cl.².................... H01J 29/70; H01J 29/72
[58] Field of Search........... 315/364, 387, 389, 399, 315/408

[56] References Cited
UNITED STATES PATENTS 3,452,244  6/1969  Dietz................................ 315/408
3,774,069  11/1973  Yasumatsuya....................... 315/408

*Primary Examiner*—Maynard R. Wilbur
*Assistant Examiner*—T. M. Blum
*Attorney, Agent, or Firm*—Eugene M. Whitacre; Paul J. Rasmussen

[57] ABSTRACT

Constant width drive pulses developed by a pulse generator are shifted in phase relative to control signals locked to synchronizing signals to maintain a predetermined phase relationship between deflection signals produced by a deflection circuit and the control signals.

6 Claims, 7 Drawing Figures

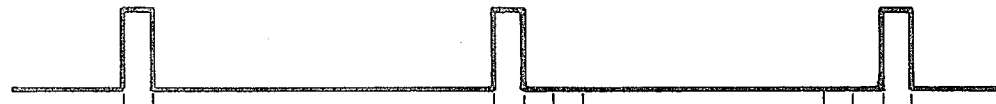
FIG. 2A
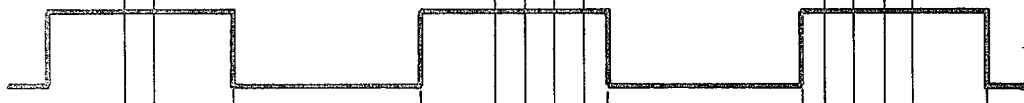
FIG. 2B
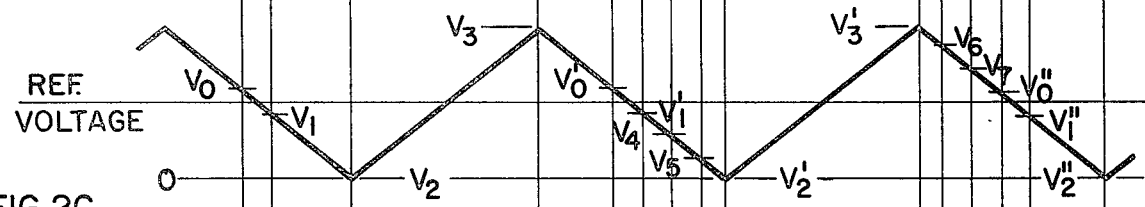
FIG. 2C
FIG. 2D
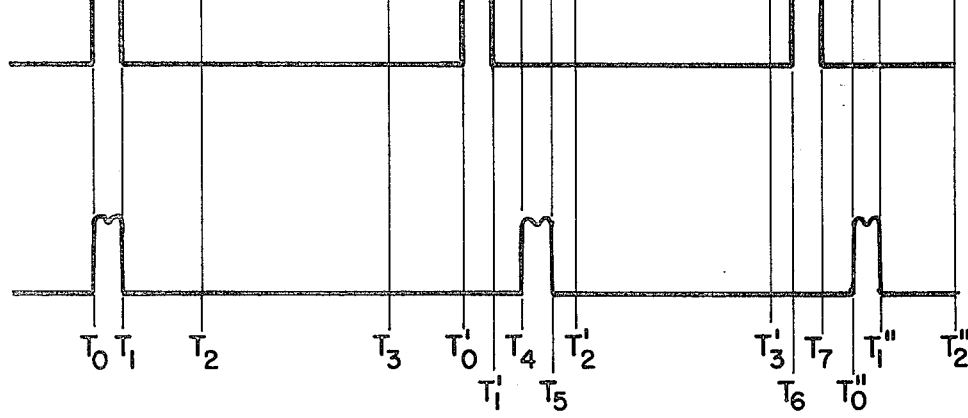
FIG. 2E
FIG. 2F

DRIVE PULSE GENERATOR FOR A TELEVISION DEFLECTION CIRCUIT

BACKGROUND OF THE INVENTION

This invention relates to a generator for supplying properly phased constant width drive pulses to a television deflection circuit.

All deflection circuits utilized in television receivers must provide for synchronization of the deflection signals produced thereby with synchronizing pulses recovered from the composite video signals being received by the television receiver or control signals locked to the synchronizing pulses. The deflection circuit may be one of many different types such as silicon controlled rectifier (SCR) type such as shown in U.S. Pat. No. 3,452,244. This type of deflection circuit requires a drive pulse of a uniform width during each deflection cycle to initiate a commutating interval. A lack of uniformity of drive pulse from one cycle to another can result in improper operation of the deflection circuit.

Because of inherent delay in the deflection circuit, the deflection signals produced thereby are delayed in time with respect to the drive pulses. Additionally the amount of delay may be a function of the loading of the deflection circuit, i.e., the greater the load the greater the delay.

To provide for synchronization of the deflection signals with the control signals, compensation must be provided for the aforementioned delay associated with the deflection circuit.

An integrated form of a circuit which performs the function of synchronization of the deflection signals with the control signals is most desirable. Prior art means utilized in integrated circuits to perform the synchronizing function have shifted the leading edge of the drive pulse supplied to the deflection circuit to compensate for the delay. However, the resulting change of drive pulse width resulting therefrom is not acceptable for use with SCR type deflection circuits as aforementioned.

SUMMARY OF THE INVENTION

In accordance with the invention a generator for supplying constant width drive pulses to a television deflection circuit to enable the development of deflection signals comprises a source of control signals. A phase comparator means coupled to the source of control signals and the deflection circuit produces a first correction signal representative of the phase relationship between the deflection signal and the control signals. An impedance means coupled to the comparator means and a constant current source develops a second correction signal differing in signal magnitude from the first correction by a constant amount determined by the impedance means and said constant current source. The first and second correction signals, thereby, establish references of the constant width drive pulse generation. A first signal level comparator means coupled to the phase comparator means and the source of control signals initiates the production of one of the drive pulses when a first predetermined relationship exists between the control signals and the first correction signal. A second signal level comparator means coupled to the constant current source and the source of control signals terminates the production of one of the drive pulses when a second predetermined relationship exists between the control signals and the second correction signal.

A more detailed description of a preferred embodiment of the invention is given in the following detailed description and accompanying drawings of which:

FIG. 1 is a schematic diagram, partially in block form, of the deflection system embodying the invention; and FIG. 2A–F illustrates waveforms obtained at various points in the diagram of FIG. 1.

DESCRIPTION OF THE INVENTION

FIG. 1 is a schematic diagram of a deflection system 10, partially in block form, embodying the invention. This system includes a synchronizing (sync) source 12 which is coupled to a source of composite signals (not shown) and produces sync pulses at regulator intervals, as shown in FIG. 2A, at an output terminal A. The output terminal A is coupled to an input terminal 14 of a first phase comparator 16. A DC reference source 18 provides a stable DC voltage which is coupled to an input terminal 20 of the first comparator 16, an input terminal 22 of a second phase comparator 24, and an input terminal 26 of a pulse generator 28. The first comparator 16 is of a conventional configuration and compares the voltage at terminal 20 to a voltage at an input terminal 30 during an interval when a logic 1 level is applied to the terminal 14. A correction signal indicative of the relative magnitude of the voltage at terminal 20 and terminal 30 is developed at an output terminal 3 of the first comparator 16 during the period of application of the logic 1 level to terminal 14.

The output terminal 31 is coupled to an input terminal 32 of a control signal generator 34. The control signal generator 34 is of a conventional configuration and develops a rectangular wave, as shown in FIG. 2b, at an output terminal B and develops a triangular wave, as shown in FIG. 2C, at an output terminal C. Correction signals at the input terminal 32 provide for phase shifting of the signals at output terminals B and C to maintain a predetermined phase relationship between the signals at output terminals B and C and the sync pulses at terminal A. The output terminal B of the control signal generator 34 is coupled to an input terminal 36 of pulse generator 28. Output terminal C of control signal generator 34 is coupled to an input terminal 38 of pulse generator 28, the input terminal 30 of first comparator 16, and an input terminal 40 of the second comparator 24.

The second comparator 24 is of a conventional configuration and functions in a manner similar to that of the first comparator 16 thus providing for a comparison of the voltage at input terminal 22 and the voltage at input terminal 40 during an interval when a logica 1 level is applied to an input terminal 42 of second comparator 24. A correction signal, as shown in FIG. 2D, which is indicative of the relative voltage level at input terminals 22 and 40 during the interval when a logic 1 level is applied to input terminal 42 is developed at an output terminal D. The output terminal D is coupled to an input terminal 46 of pulse generator 28.

The terminal 46 of pulse generator 28 is coupled to the base electrode of a first buffer transistor 54. The collector electrode of transistor 54 is coupled to a direct current source (B+). The input terminal 26 is coupled to the base electrode of a second buffer transistor 56. The collector electrode of transistor 56 is coupled to B+. The emitter electrodes of transistors 54 and 56 are coupled by means of a resistor 58 to the collector electrode of a transistor 60 which operates in conjunction with a resistor 62 and a diode 64 to form a first constant current generator 65 which provides a constant current flow through the resistor 58 in the presence of conduction of transistor 54 or transistor 56.

The emitter electrodes of transistors 54 and 56 are also coupled to the base electrode of a transistor 66 which operates in conjunction with a transistor 68 to form an emitter couple pair functioning as a first signal level comparator. The emitter electrodes of transistors 66 and 68 are coupled to the collector electrode of a transistor 70 which operates in conjunction with a resistor 72 and a diode 74 to form a second constant current generator 75 which functions to controllably disable and provide a constant current flow through the emitter electrodes 66 and 68.

The collector electrode of transistor 60 is coupled to the base electrode of a transistor 76 which operates in conjunction with a transistor 78 to form an emitter couple pair functions as a second signal level comparator. The emitter electrodes of transistors 76 and 78 are coupled to the collector electrode of a transistor 80 which operates in conjunction with a resistor 82 and a diode 84 to form a constant current generator 85 which functions to controllably disable and provide for constant current flow through the emitter electrodes of transistors 76 and 78.

The base electrodes of transistors 68 and 78 are coupled to the input terminal 38. Resistors 72 and 82 are coupled to input terminal 36 to provide for collector current flow in transistors 70 and 80 in response to a logic 1 level at input terminal 36. The collector electrode of transistor 66 is coupled to an input terminal 86 of a drive current source 88. The collector electrodes of transistors 68 and 76 are coupled to an input terminal 90 of the current source 88. The collector electrode of transistor 78 is coupled to B+.

An output terminal 92 of current source 88 is coupled to the output terminal E. A logic O level exists at output terminal 92 when current flows out of input terminal 90 regardless of whether current is flowing out of terminal 86 or not. A logic 1 exists at output terminal 92 when current is flowing out of input terminal 86 in the absence of current flow out of input terminal 90.

The output terminal E is coupled to an input terminal 48 of a deflection circuit 50. The deflection circuit 50 produces a first deflection signal at an output terminal 52 in response to drive pulses as shown in FIG. 2E which provides for the development of a high voltage potential which is applied to the ultor electrode of a kinescope tube (not shown) and provides for a deflection of the electron beam produced by the kinescope tube. A second deflection signal as shown in FIG. 2F is developed at an output terminal F of deflection circuit 50 in response to drive signals at output terminal E of pulse generator 28 as shown in FIG. 2E. The output terminal F is coupled to the input terminal 42 of second comparator 24.

In operation the control signal generator 34, the DC reference source 18, second comparator 24, pulse generator 28, and deflection circuit 50 must be considered under three different conditions. These three conditions are (1) no loading of deflection circuit 50, therefore no phase delay exists between input terminal 48 and output terminal F of deflection 50, (2) the deflection circuit 50 is is loaded, therefore a phase shift exists between the signal at input terminal 48 and output terminal F, (3) phase shifting of the signal produced at output terminal E of pulse generator 28 in response to a correction signal produced at output terminal D of second comparator 24 to maintain a predetermined phase relationship between the control signals at output terminals B and C and the second deflection signal at terminal F.

In the absence of a correction signal at output terminal D of second comparator 24 in the initial stages of energization of the deflection generator 10, the voltage on the base electrode of transistor 66 is determined by the DC reference source 18 which is coupled via terminal 26 to the base electrode of transistor 56. When a correction signal is developed by the second comparator 24 which is equal to or greater than DC reference source output voltage, the voltage on the emitter electrode of transistor 66 is determined by the voltage at output terminal D of second comparator 24.

During condition one (1) as detailed above, no loading of deflection circuit 50 exists, however, some correction signal must be generated by the second comparator 24 at output terminal D in order that the base electrode of transistor 54 be approximately 0.7 volts (1 $V_{BE}$) above $V_0$ so that the voltage on the base electrode of transistor 66 will be equal to $V_0$ as shown in FIG. 2. By properly selecting the value of the resistor 58 in relationship to the current generator 65, a voltage of $V_1$ can be developed at the base electrode of transistor 76 when the base electrode of transistor 66 is at $V_0$.

Just prior to $T_0$ the voltage at input terminal 38, as shown in FIG. 2C, is greater than $V_0$ and terminal 36 is at a logic 1 as shown in FIG. 2B. With a voltage greater than $V_0$ on input terminal 38 and a logic 1 on terminal 36, the transistors 68 and 78 are conducting and current flows out of input terminal 90 of current source 88. With transistor 68 conducting, transistor 66 is cut off and no current flows out of input terminal 86 of current source 88. Under these conditions output terminal 92 of current source 88 is at a logic 0 and output terminal F of deflection circuit 50 is at a logic 0.

When the voltage on input terminal 38 decreases to just below $V_0$ just after $T_0$, the transistor 66 goes into conduction and current flows out of input terminal 86 of current source 88 and transistor 68 is cut off. Under these conditions, a logic 1 exists at output terminal 92 of current source 88 and output terminal F of deflection circuit 50 is at logic 1 providing for the comparison of the voltage at terminals C and 40 with the DC reference source voltage on terminal 22 of second comparator 24.

When the voltage on input terminal 38 decreases to just below $V_1$ just after $T_1$, transistor 76 is placed in conduction causing current to flow out of input terminal 90 of current source 88 resulting in a logic 0 at output terminal 92 of current source 88. With a logic 0 on output terminal 92 the output terminal F of deflection circuit 50 returns to a logic 0 terminating the comparison process of second comparator 24.

At $T_2$ the signal at output terminal B of control signal generator 34 goes to a logic 0. With a logic 0 on input terminal 36 of pulse generator 28, the current sources 75 and 85 cease the production of current and transistors 66, 68, 76, and 78 are cut off and no current flows out of input terminals 86 and 90 of current source 88 during the interval $T_2 - T_3$. With no current flowing out of input terminals 86 and 90 of current source 88, output terminals 92 and E are at a logic 0 and output terminal F of deflection circuit 50 remains at a logic 0 during the interval $T_2 - T_3$.

At $T_3$ terminal 36 makes a transition from a logic 0 to a logic 1 providing for the production of current by current sources 75 and 85 and conduction of transistors 68 and 78 because the voltage on terminal 38 is above $V_0'$.

During condition two (2) as detailed above, at $T_0'$ a voltage of $V_0'$ exists at a terminal 38 and terminal 36 is at a logic 1. Since the correction signal at output terminal D has not yet been altered by a comparison of the voltage at input terminal 22 with that of the voltage at input terminal 40 under conditions wherein the deflection circuit 50 is loaded, the signal at output terminal E will make a transition from a logic 0 to a logic 1 at $T_0'$. Also, the signal at output terminal E will make a transition from a logic 1 to a logic 0 at $T_1'$.

At $T_4$ the signal at output terminal F of deflection circuit 50 will make a transition from a logic 0 to a logic 1 and will remain at a logic 1 until $T_5$. During this interval the voltage at input terminal 40 of second comparator 24 will range from $V_4$ to $V_5$. The average of these voltages is less than the reference voltage, therefore a correction signal, as shown in FIG. 2D, which is in excess of the reference voltage will be developed at output terminal D of second comparator 24. This new correction signal is equal to $V_6 + (1\ V_{BE})$ and, therefore, will produce the correct deflection circuit delay compensation in the pulse generator 28 as explained below.

During condition three (3) as detailed above at $T_6$ a voltage of $V_6$ will be present at input terminal 38 of pulse generator 28. At this voltage level the transistor 68 will be cut off and transistor 66 will go into conduction producing a logic 1 at output terminal E of pulse generator 28. At $T_7$ a voltage of $V_7$ will be present at the input terminal 38 of pulse generator 38 and transistor 78 will be cut off and transistor 76 will go into conduction. With transistors 66 and 76 in conduction a logic 0 will be developed at output terminal E of pulse generator 28.

The production of the pulse at output terminal E between the time interval $T_6 - T_7$ will provide for the production of a horizontal output pulse at output terminal F of deflection circuit 50 during the interval $T_0''$ to $T_1''$. During this interval the average voltage at terminal 40 of second comparator 24 will equal the DC reference source voltage on terminal 22, therefore no change of the correction signal will occur.

As can be seen from the above description, pulses may be developed at the output terminal E of pulse generator 28 which have a uniform width and a phase relationship with the control signals at output terminal C of control signal generator 34 which will provide for a synchronization of the deflection signal at terminal F of deflection circuit 50 with the control signals at output terminal C of control signal generator. The control signals in turn being locked to synchronizing pulses developed at output terminal A of synchronizing source 12 provide for synchronization of the deflection signals with the synchronizing pulses.

What is claimed is:

1. A generator for supplying constant width drive pulses to a television deflection circuit to enable the development of deflection signals comprising:
    a source of control signals; phase comparator means coupled to said source of control signals and said deflection circuit for producing a first correction signal representative of the phase relationship between said deflection signal and one of said control signals;
    first command current source;
    impedance means coupled to said comparator means and said first constant current source for developing a second correction signal differing in signal magnitude from said first correction signal by a constant amount determined by said impedance means and said first constant current source, said first and second correction signals thereby establishing references for said constant width drive pulse generation;
    source of drive current;
    first signal level comparator means coupled to said phase comparator means, said source of drive current and said source of control signals for initiating the production of drive current by said source of drive current when a first predetermined relationship exists between said control signals and said first correction signal; and
    second signal level comparator means coupled to said first constant current source, said source of drive current and said source of control signals for terminating the production of drive current by said source of drive current when a second predetermined relationship exists between said control signals and said second correction signal.

2. A generator according to claim 1 wherein said first and said second signal level comparator means include first and said second disabling means, respectively, for disabling said first and said second level comparator means in response to another of said control signals.

3. A generator according to claim 2 wherein said first and second disabling means are second and third constant current sources, respectively.

4. A generator according to claim 3 wherein said first signal level comparator means further includes first and second transistors each having emitter, base, and collector electrodes; said emitter electrodes of said first and said second transistors being coupled to said second constant current source, said collector electrodes of said first and second transistors being coupled to said source of drive current, said base electrode of said first transistor being coupled to said phase comparator means and said base electrode of said second transistor being coupled to said source of control signals.

5. A generator according to claim 4 wherein said second signal level comparator means further includes third and fourth transistors each having emitter, base, and collector electrodes; said emitter electrodes of said third and said fourth transistors being coupled to said third constant current source, said collector electrodes of said third and said fourth transistors being coupled to said source of drive current, said base electrode of said third transistor being coupled to said first current source and said base electrode of said fourth transistor being coupled to said source of control signals.

6. A generator according to claim 5 and further including a correction signal threshold means coupled to said first signal level comparator means for establishing a threshold correction signal at said base electrode of said first transistor of said first signal level comparator means.

* * * * *

UNITED STATES PATENT OFFICE
CERTIFICATE OF CORRECTION

PATENT NO. : 3,992,648

DATED : November 16, 1976

INVENTOR(S) : Leslie Ronald Avery

It is certified that error appears in the above-identified patent and that said Letters Patent are hereby corrected as shown below:

On the title sheet, under Foreign Application Priority Data, insert -- Oct. 30, 1974 United Kingdom 46962/74 --; that portion reading "Feb. 11, 1975 United Kingdom 46962/75" should read -- Feb. 11, 1975 United Kingdom 46962/74 --.
Column 1, line 56 that portion reading "correction by" should read -- correction signal by --; Column 2, line 31, that portion reading "terminal 3" should read -- terminal 31 --; line 54, that portion reading "logica" should read -- logic --; Column 3, line 18, that portion reading "electrodes 66 and 68" should read -- electrodes of transistors 66 and 68 --;
Column 6, line 5, that portion reading "first command current source" should read -- first constant current source --; line 33, that portion reading "first and said second disabling means" should read -- first and second disabling means --; line 34, that portion reading "second level" should read -- second signal level --; line 45, that portion reading "first and second transistors" should read -- first and said second transistors --; line 58, that portion reading "first current" should read -- first constant current --.

Signed and Sealed this

Fifteenth Day of March 1977

[SEAL]

Attest:

RUTH C. MASON
*Attesting Officer*

C. MARSHALL DANN
*Commissioner of Patents and Trademarks*